(12) United States Patent
Chen et al.

(10) Patent No.: US 7,337,297 B2
(45) Date of Patent: Feb. 26, 2008

(54) METHOD AND APPARATUS FOR RECORDING DATA WITH PSEUDO-MERGE

(75) Inventors: Cheng-Che Chen, Kaohsiung (TW); Yu-Cheng Hsieh, Renwu Township, Kaohsiung County (TW)

(73) Assignee: MediaTek Inc., Hsinchu (TW)

( * ) Notice: Subject to any disclaimer, the term of this patent is extended or adjusted under 35 U.S.C. 154(b) by 252 days.

(21) Appl. No.: 11/190,836

(22) Filed: Jul. 28, 2005

(65) Prior Publication Data

US 2006/0026221 A1 Feb. 2, 2006

(30) Foreign Application Priority Data

Jul. 30, 2004 (TW) .............. 93123029 A
Mar. 4, 2005 (TW) .............. 94106730 A (51) Int. Cl.
*G06F 12/00* (2006.01)
(52) U.S. Cl. .............. 711/170
(58) Field of Classification Search ........ 711/170; 707/205
See application file for complete search history.

(56) References Cited

U.S. PATENT DOCUMENTS

| 5,107,423 | A | 4/1992 | Sasaki et al. |
| 5,630,138 | A * | 5/1997 | Raman ............ 717/162 |
| 5,826,069 | A | 10/1998 | McCullough et al. |
| 6,134,243 | A | 10/2000 | Jones et al. |
| 6,212,097 | B1 * | 4/2001 | Kihara et al. ........ 365/185.04 |
| 6,477,544 | B1 * | 11/2002 | Bolosky et al. ........ 707/200 |
| 6,487,713 | B1 * | 11/2002 | Cohen et al. ........ 717/105 |
| 7,051,047 | B2 * | 5/2006 | Jung et al. ........ 707/104.1 |
| 2002/0194251 | A1 * | 12/2002 | Richter et al. ........ 709/105 |
| 2004/0177343 | A1 * | 9/2004 | McVoy et al. ........ 717/122 |
| 2004/0201681 | A1 * | 10/2004 | Chen et al. ........ 348/207.1 |

FOREIGN PATENT DOCUMENTS

| TW | 530250 | 5/2003 |
| TW | 5320216 | 5/2003 |
| TW | 589693 | 6/2004 |

OTHER PUBLICATIONS

"Proposed Revised Common Text Multimedia File Format Specification", by David Singer et al. ISO/IEC FDIS 14496-12:2003(E).

* cited by examiner

*Primary Examiner*—Hiep T. Nguyen
(74) *Attorney, Agent, or Firm*—Rabin & Berdo, P.C.

(57) ABSTRACT

A method and an apparatus for recording data with pseudo-merge are provided. The apparatus comprises a storage medium for storing a first and a second files and a File Allocation Table (FAT) for recording a first start position and a first end position for the first file and recording a second start position and a second end position for the second file. The method modifies the first end position of the first file to be the second start position of the second file so as to merge the first and second files into a first merged file.

21 Claims, 6 Drawing Sheets

METHOD AND APPARATUS FOR RECORDING DATA WITH PSEUDO-MERGE

This application claims the benefit of Taiwan application Serial No. 93123029, filed Jul. 30, 2004, and Taiwan application Serial No. 94106730, filed Mar. 4, 2005, the subject matter of which are incorporated herein by reference.

BACKGROUND OF THE INVENTION

1. Field of the Invention

The invention relates in general to a data recording method and an apparatus thereof, and more particularly to a data recording method and an apparatus thereof for pseudo-merging at least two files.

2. Description of the Related Art

A multimedia embedded system adopts MPEG-4 video compression technology and 3GPP technology for recording audio/video data and storing multimedia files in a storage medium. The storage space of the embedded system is limited, and the way of recording data greatly influences the size of the storage space and the usage volume of the memory. Therefore, how to record data has become an important issue for the designer/manufacturer of the embedded system.

According to a conventional way for recording data, the video frame and the audio frame are respectively recorded in the video file and the audio file. Meanwhile, the information for each frame is also stored in the memory for recording the sample data of each frame.

When the recording is finished, the video file and the audio file are merged by appending one file to another. First, the content of the audio file is sequentially accessed, and then the accessed audio file is appended to the end of the video file. Besides, when the sample data is converted to and stored in a sample table, the sample table is also appended to the end of the video file.

The storage unit for storing a file is one cluster, and a file is stored in a plurality of clusters. Each of the clusters has 512 bytes. When the size of the stored file is not an integral multiple of 512 bytes, the remnant space called as "hole" would exist at the end of the file. Conventionally, when merging a first file and a second file, the second file is accessed and then recoded in the end of the first file. Therefore, the beginning position for recording the second file is the "hole". That is to say, the End-Of-File (EOF) of the first file is used as the start point from which the accessed content of the second file is recorded.

According to the conventional way for merging audio and video data, which is implemented by appending one file to another, in the end of a first file, sufficient space has to be reserved for recording a second file. Only after the first and second files have been completely recorded can the second file be accessed and moved to the reserved space so as to be appended to the end of the first file. Therefore, when it is chosen to append an audio file to the end of a video file, in the end of the video file, sufficient space must be reserved for recording the audio file. Similarly, when it is chosen to append a video file to the end of an audio file, in the end of the audio file, sufficient space must be reserved for recording the video file.

SUMMARY OF THE INVENTION

It is therefore the object of the invention to provide a method and an apparatus for recording data with pseudo-merge, thus greatly saving file storage space and reducing the usage of the memory.

According to an object of the invention, a method for recording data with pseudo-merge is provided. The method merges a first file and a second file which are generated in a storage medium. The first file and the second file respectively have at least a first frame and at least a second frame. The merging method is achieved by modifying an end position of the first file in the File Allocation Table (FAT) to be a start position of the second file, or by establishing a linkage relationship between the first file and the second file in the File Allocation Table, for merging the first file and the second file into a merged file. Besides, the data recording method includes: (1) recording a header in the first file, wherein the header records an original file length of the first file; (2) establishing a linkage relationship between the first file and the second file in the storage medium for merging the first file and the second file into a merged file without changing the actual storage addresses of the first file and the second file in the storage medium; (3) calculating a merged file length of the merged file; (4) updating the header for recording the merged file length in the header; and (5) appending a sample table to the end of the merged file.

According to another object of the invention, a file merging apparatus for merging a first file and a second file is provided. The file merging apparatus includes a storage medium and a File Allocation Table. The storage medium stores the first file and the second file. The File Allocation Table (FAT) is used to record a first start position and a first end position of the first file stored in the storage medium, and record a second start position and a second end position of the second file stored in the storage medium. The first end position of the first file is modified to be the second start position of the second file when the first file and the second file are merged into a merged file.

Other objects, features, and advantages of the invention will become apparent from the following detailed description of the preferred but non-limiting embodiments. The following description is made with reference to the accompanying drawings.

DETAILED DESCRIPTION OF THE INVENTION

The data recording method according to the invention is applicable to an electronic apparatus having a storage medium. The method merges two files stored in the storage medium by pseudo-merging, and the two files are merged into a merged file without being moved. The file merging apparatus according to the invention, which is preferably used in an embedded system, includes a storage medium and a File Allocation Table. The storage medium can be a flash memory for instance, and is used for storing a first file and a second file. The File Allocation Table respectively records a first start position and a first end position for the first file and a second start position and a second end position for the second file in the storage medium. The file merging method according to the invention modifies the first end position of the first file to be the second start position of the second file in the File Allocation Table for merging the two files into a merged file. Another file merging method according to the invention establishes a linkage relationship between the first file and the second file in the File Allocation Table for merging the two files into a merged file. Especially, if the two files are created at the same time, such as two multimedia data files which are recorded at the same time, there is no need to reserve any storage space among the two files for moving file. Consequently, the processing speed is increased and the needed file storage space is reduced.

First Embodiment

Figure 1A:
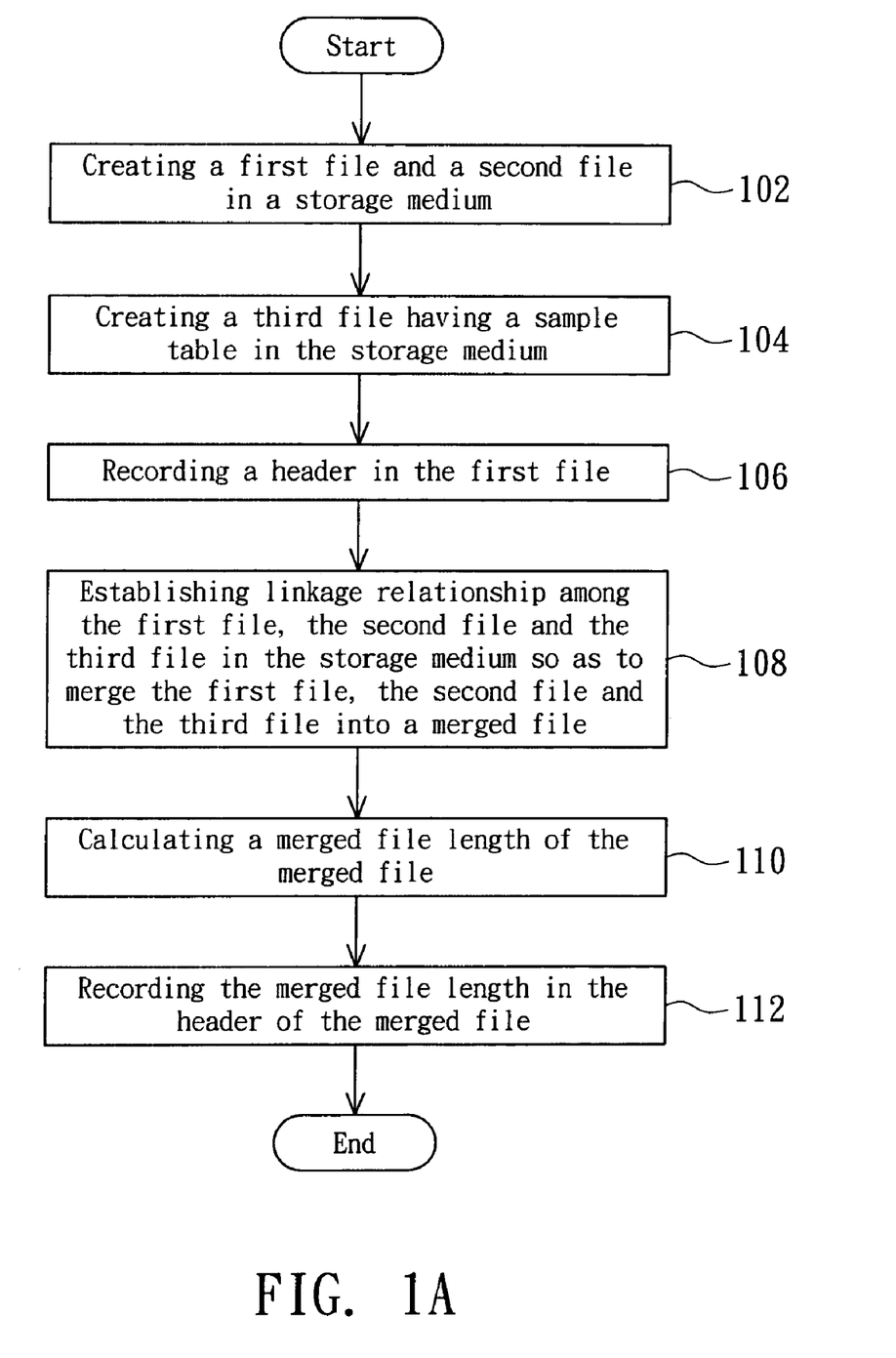
FIG. 1A is a flowchart of a method for recording data with pseudo-merge according to a first embodiment of the invention.

Referring to FIG. 1A, a flowchart of a method for recording data with pseudo-merge according to a first embodiment of the invention is shown. The method for recording data with pseudo-merge begins with step 102, where a first file and a second file are created in a storage medium, and the first file and the second file respectively have 4 first frames and 3 second frames. Next, in step 104, a third file having a sample table is created in the storage medium, and the sample table is generated by converting the sample data of the first frames. In step 106, a header H is recorded in the first file, and the header includes an original file length of the first file. In step 108, a linkage relationship among the first file, the second file and the third file in the storage medium is established so as to merge the first file, the second file and the third file into a merged file without moving the files. That is, the actual storage positions in the storage medium for the first file, the second file and the sample table are not changed. In step 110, a merged file length of the merged file is calculated. To calculate the merged file length, a magnetic region size (S) of the storage medium, the original file length (N1) of the first file, and a second file length (N2) of the second file are obtained first. Then, M1=ceil (N1/S) and M2=ceil (N2/S) are calculated, and therefore, the merged file length (LEN) is obtained to be (M1+M2)*S. Last, in step 112, the header is updated, and the merged file length is recorded in the header of the merged file.

Figure 1B:
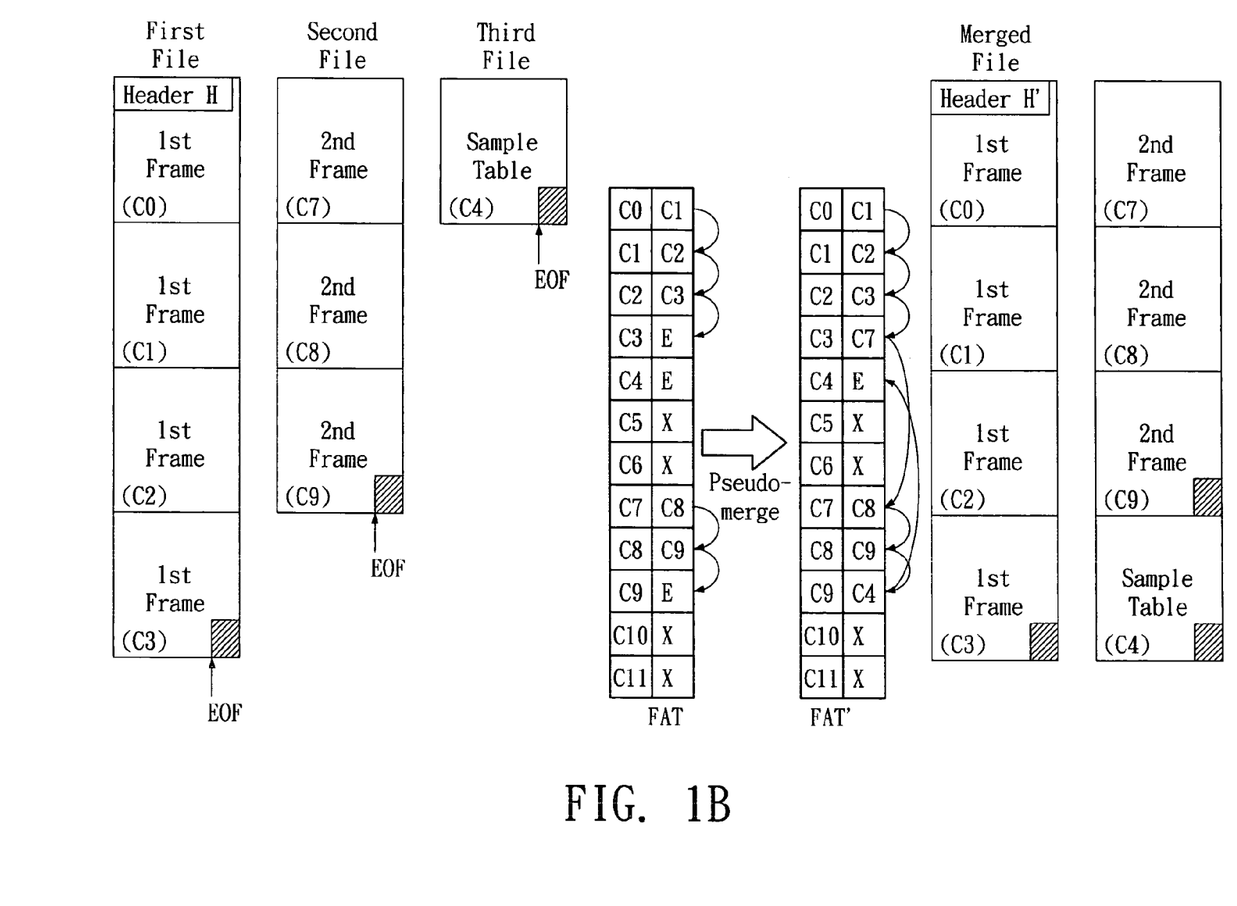
FIG. 1B is a diagram showing the method for recording data with pseudo-merge of FIG. 1A applied in an FAT file system.

FIG. 1B is a diagram showing the method for recording data with pseudo-merge of FIG. 1A is applied in an FAT file system. The file positions in the storage medium are recorded in a File Allocation Table (FAT). The first file has a plurality of first frames respectively stored in clusters C0~C3 of the storage medium; the second file has a plurality of second frames respectively stored in clusters C7~C9 of the storage medium. The sample table of the third file is stored in a cluster C4 of the storage medium. The EOF (End of File) for the first file, the second file and the third file are respectively positioned at the clusters C3, C9 and C4. The header H includes an original file length of the first file, and the header is recorded at the start position of the first file.

As for the first file, the clusters C0 points towards/is linked to the cluster C1, the cluster C1 points towards/is linked to the cluster C2, the cluster C2 points towards/is linked to the cluster C3, while the EOF is positioned at the cluster C3. As for the second file, the clusters C7 points towards/is linked to the cluster C8, the cluster C8 points towards/is linked to the cluster C9, while the EOF is positioned at the cluster C9. It should be noted that before the pseudo-merging, there is no linkage relationship between the first and second files. Namely, no cluster of the first file is linked to any cluster of the second file. The third file only has one cluster C4, and the cluster C4 is not linked to any cluster of the first and second files. Namely, there is no linkage relationship between the third file and the second file, neither the first file.

As shown in FIG. 1B, the content of the FAT is modified to be the FAT', and a linkage relationship among the first file, the second file, and the third file is established so as to pseudo-merging the files. To merge two files into a merged file, in the File Allocation Table, the end position of the first file is modified to be the start position of the second file, or a linkage relationship among the first file and the second files is established in the File Allocation Table. As shown in FIG. 1B, in the modified FAT', the cluster C3 points towards the cluster C7, while the cluster C9 points towards the cluster C4. Therefore, the linkage relationship is established between the first file and the second file by linking the cluster C3 to the cluster C7, and the linkage relationship is established between the second file and the third file by linking the cluster C9 to the cluster C4, thus pseudo-merging the first file, the second file and the third file into a merged file. In the merged file, the first file is arranged in front of the second file, while the second file is arranged in front of the third file. The first file and the second file are preferred to be two multimedia data files recorded at the same time. The first file and the second file are respectively a video data file and an audio data file, or are respectively an audio file and a video file.

As shown in FIG. 1B, before the pseudo-merge, the end position of the first file in the FAT is E, and then is modified to be the start position of the second file, which is the cluster C7. Similarly, before the pseudo-merge, the end position of the second file in the FAT is E, and then is modified to be the start position of the third file, which is the cluster C4. Thus, the pseudo-merging of the first, second and third files are achieved.

In the present invention, a header of a file records file length and file type of that file. After pseudo-merge, as shown in FIG. 1B, the header H in the first file is updated to be H'in the merged file for records the merged file length of the merged file, while the file type recorded in the header H'is the same as that recorded in the header H, which is the file type of multimedia data file. The multimedia data file does not require compact linkage, so the holes existing in the first, second and third files are acceptable for the file system. Therefore, the file system will processes/handles the holes existing in the merged file after the pseudo-merge. According to above disclosure, it is obvious that according to the method for recording data with pseudo-merge of the first embodiment of the invention, when files are merged, the actual storage positions of the files in the storage device remain unchanged. That is, the files are merged without being moved.

Second Embodiment

Figure 2A:
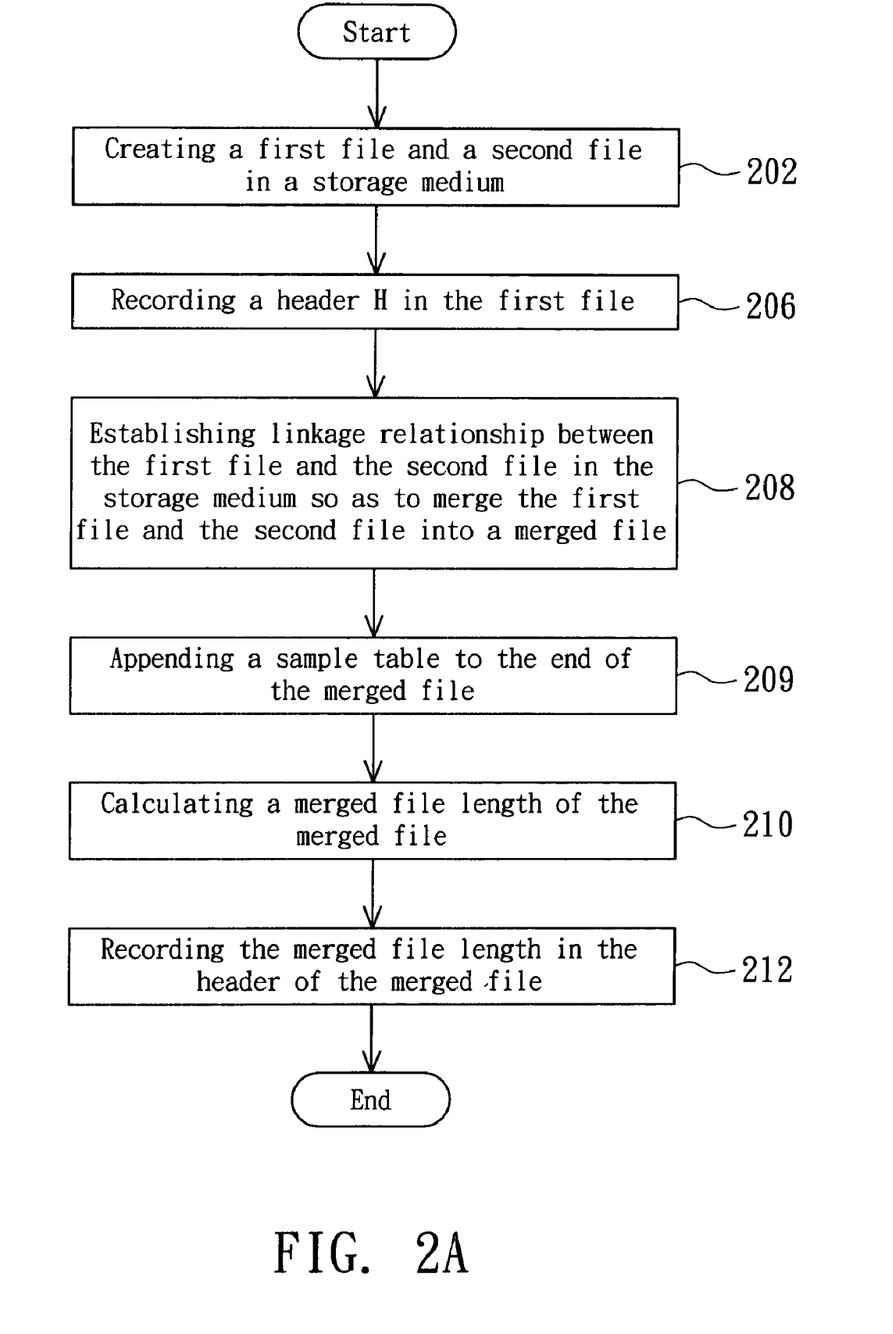
FIG. 2A is a flowchart of a method for recording data with pseudo-merge according to according to a second embodiment of the invention.

Referring to FIG. 2A, a flowchart of a method for recording data with pseudo-merge according to a second embodiment of the invention is shown. The method for recording data with pseudo-merge begins with step 202, where a first file and a second file are created in a storage medium, and the first file and the second file respectively have 4 first frames and 3 second frames. Next, in step 206, a header H is recorded in the first file, and the header H records an original file length of the first file. In step 208, a linkage relationship is established between the first file and the second file by linking the last of the first frames, i.e. the cluster C3, to the first of the second frames, i.e. the cluster C7, and therefore, the first file and the second file are merged into a merged file without moving the files. Namely, the actual storage positions of the first file, which is stored in the cluster C0-C3 of the storage medium, and the second file, which is stored in the cluster C7-C9 of the storage medium are not changed. In step 209, a sample table is appended to the end of the merged file. The sample table is obtained by converting the sample data of the first frames of the first file. The sample data is recorded in a third file in the storage medium or in a temporary memory. Then, in step 210, a merged file length of the merged file is calculated. To calculate the merged file length, a magnetic region size (S) of the storage medium, an original file length (N1) of the first file, and a second file length (N2) of the second file are obtained so as to calculate M1=ceil(N1/S), M2=ceil(N2/S). Then, the merged file length (LEN) is obtained according to the formula: (M1+M2)*S. Last, in step 212, the header H is updated to be H', and the merged file length is recorded in the header H' of the merged file.

Figure 2B:
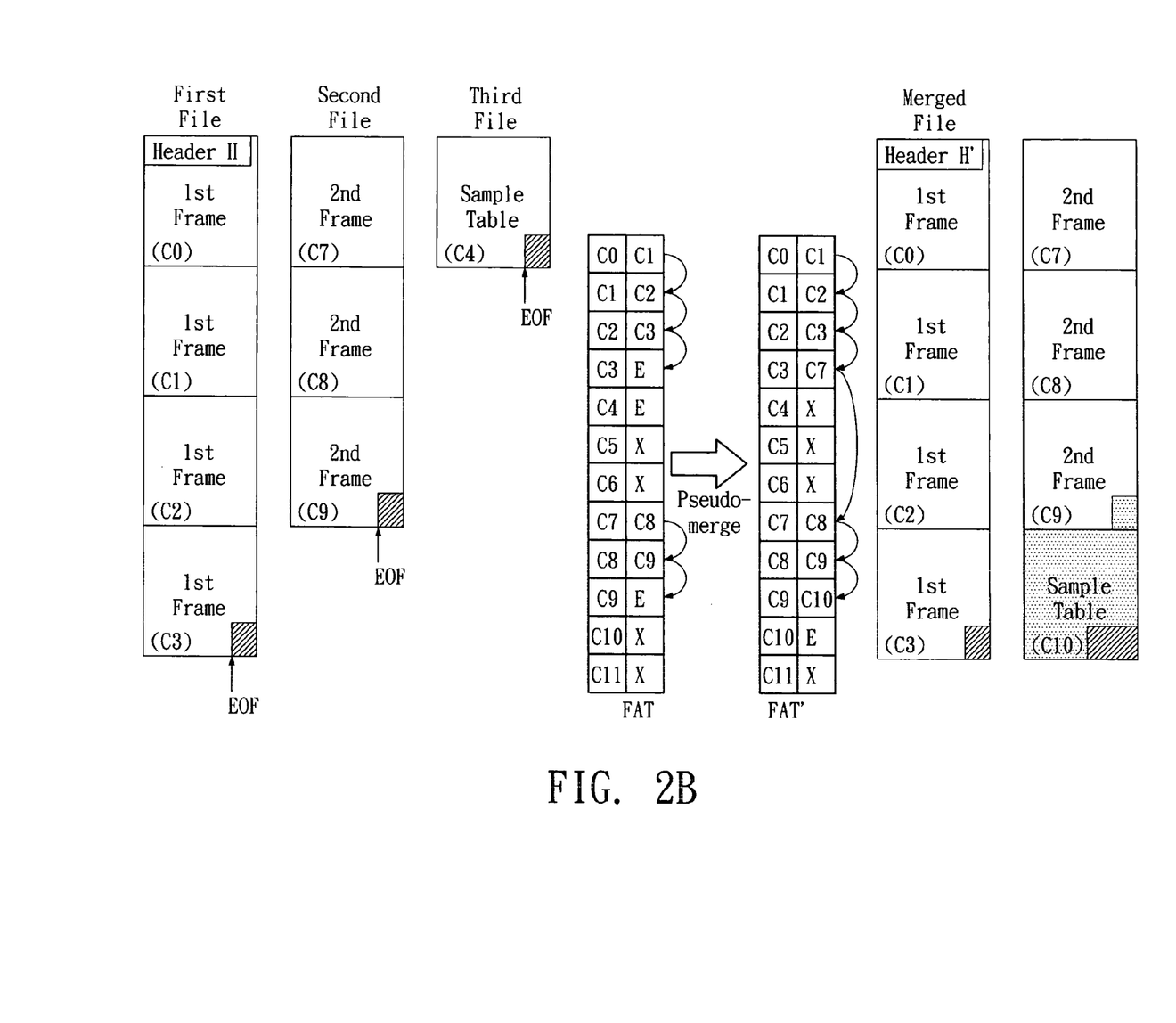
FIG. 2B is a diagram showing the method for recording data with pseudo-merge of FIG. 2A applied in an FAT file system.

FIG. 2B is a diagram showing the method for recording data with pseudo-merge of FIG. 2A is applied in an FAT file system. As shown in FIG. 2B, the file positions in storage medium are recorded in a File Allocation Table. The first file has 4 first frames respectively stored in clusters C0~C3 of the storage medium; the second file has 3 second frames respectively stored in clusters C7~C9 of the storage medium. The sample table, i.e. the third file, is stored in a cluster C4 of the storage medium. The EOF of the first file, the second file and the third file are respectively positioned at the clusters C3, C9 and C4. The header H records an original file length of the first file, and is recorded at the start position of the first file.

As shown in FIG. 2B, the content of the FAT is modified to be the FAT', and a linkage relationship among the first file and the second file is established so as to pseudo-merging the files. To merge two files into a merged file, in the File Allocation Table, the end position of the first file is modified to be the start position of the second file, or a linkage relationship among the first file and the second files is established in the File Allocation Table. As shown in FIG. 2B, in the modified FAT', the cluster C3 points towards the cluster C7, and therefore, the linkage relationship is established between the first file and the second file by linking the cluster C3 to the cluster C7, thus pseudo-merging the first file and the second file into a merged file. In the merged file, the first file is arranged in front of the second file. The first file and the second file are preferred to be two multimedia data files recorded at the same time. The first file and the second file are respectively a video data file and an audio data file, or are respectively an audio file and a video file.

As shown in FIG. 2B, before the pseudo-merge, the end position of the first file in the FAT is E, and then is modified to be the start position of the second file, which is the cluster C7, so as to pseudo-merge the first and second files.

Compared with the first embodiment, the second embodiment appends the third file, i.e. the sample table, to the merged file after the first file and the second file are pseudo-merged. The content of the third file is accessed from the cluster C4, and then the accessed content is filled into the hole existing in the cluster C9 and then continuously into the cluster C10 so as to append the sample table to the merged file. The appending of the third file to the merged file is achieved by moving the third file to the end of the merged file. Namely, the actual storage position of the third file in the storage medium is changed from the cluster C4 to the cluster c10. Since the data size of the third file is relatively small, the overall performance of the data recording method according to the invention is not affected.

Similarly, after pseudo-merge, as shown in FIG. 2B, the header H in the first file is updated to be H' in the merged file for records the merged file length of the merged file, while the file type recorded in the header H' is the same as that recorded in the header H, which is the file type of multimedia data file. The multimedia data file does not require compact linkage, so the holes existing in the first and second files are acceptable for the file system. Therefore, the file system will processes/handles the holes existing in the merged file after the pseudo-merge.

Third Embodiment

Figure 3A:
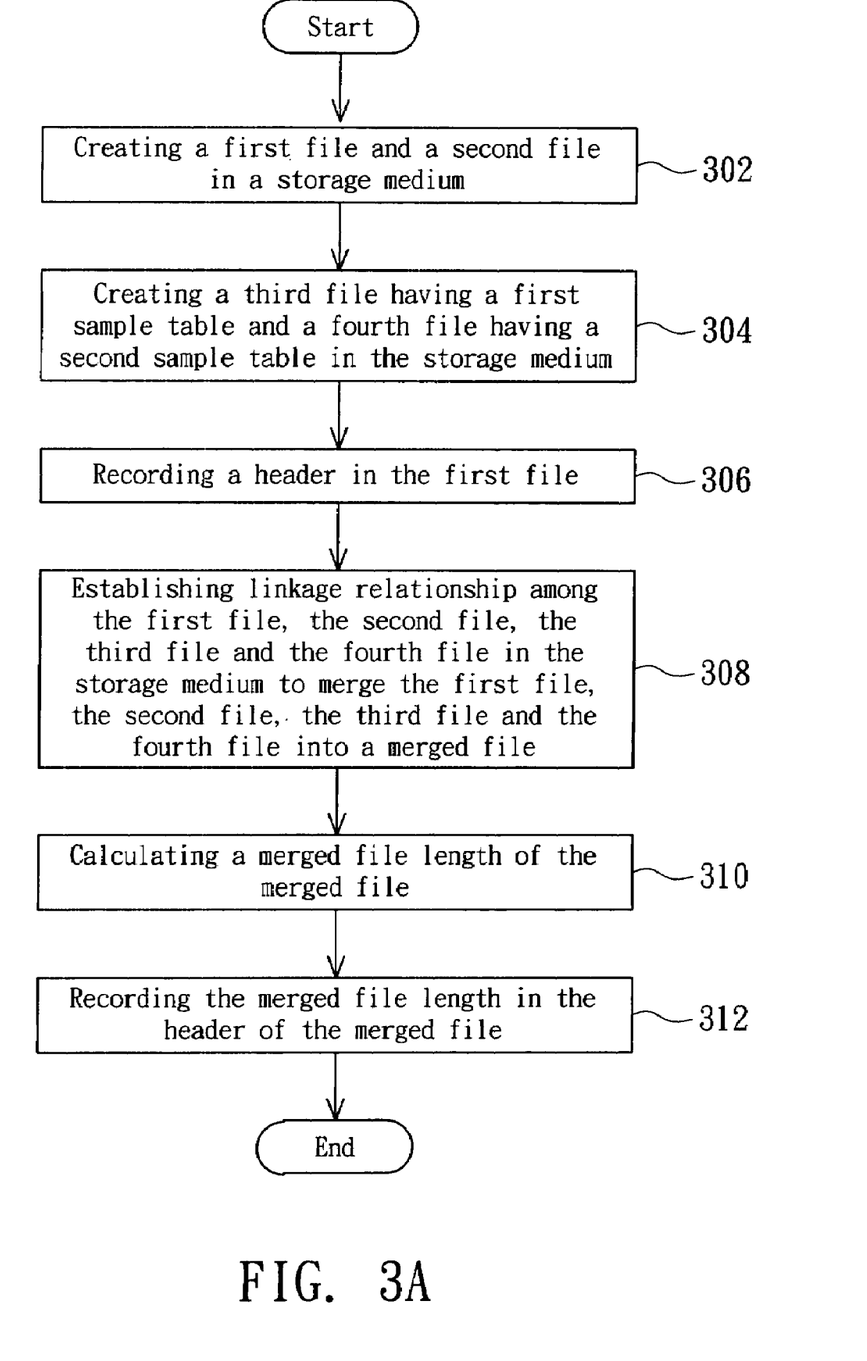
FIG. 3A is a flowchart of a method for recording data with pseudo-merge according to a third embodiment of the invention.

Referring to FIG. 3A, a flowchart of a method for recording data with pseudo-merge according to a third embodiment of the invention is shown. The method for recording data with pseudo-merge begins with step 302, where a first file and a second file are created in a storage medium, and the first file and the second file respectively have 4 first frames and 3 second frames. Next, in step 304, a third file having a first sample table and a fourth file having a second sample table are respectively created in the storage medium. The first sample table and the second sample table are respectively obtained by converting the sample data of the first frames and by converting the sample data of the second frames. In step 306, a header H is recorded in the first file, and the header includes an original file length of the first file. In step 308, the linkage relationship among the first file, the second file, the third file and the fourth file is established so as to merge the first file, the second file, the third file and the fourth file into a merged file without changing the storage positions of the first frames, the second frames, the first sample table and the second sample table in the storage medium. Then, in step 310, a merged file length of the merged file is calculated. To calculate the merged file length, a magnetic region size (S) of the storage medium, an original file length (N1) of the first file and a second file length (N2) of the second file are obtained so as to have M1=ceil(N1/S), M2=ceil(N2/S). Then, the merged file length (LEN) is obtained according to the formula (M1+M2)*S. Last, in step 312, the header is updated, and the merged file length is recorded in the header of the merged file.

Figure 3B:
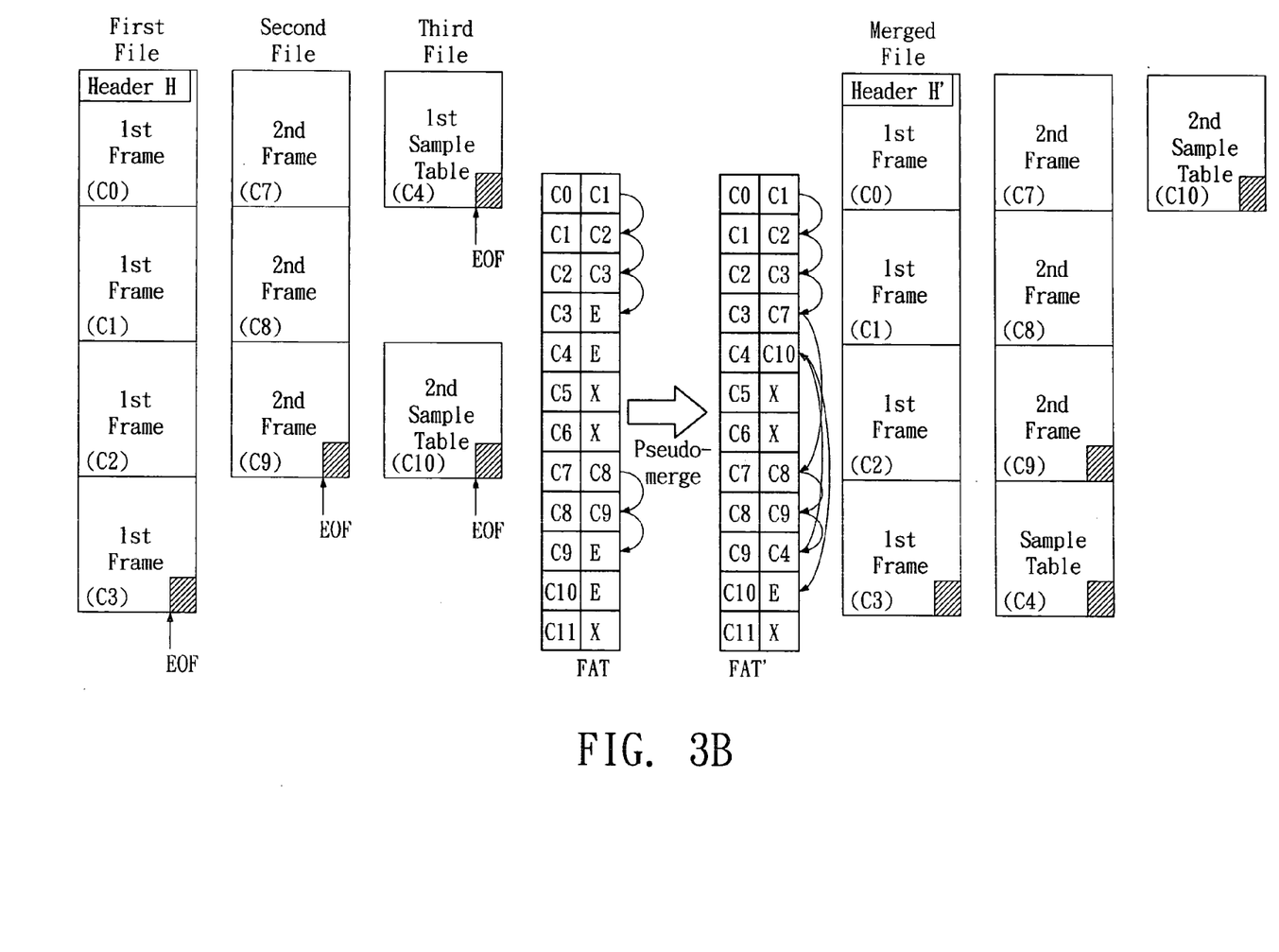
FIG. 3B is a diagram showing the method for recording data with pseudo-merge of FIG. 3A applied in an FAT file system.

FIG. 3B is a diagram showing the method for recording data with pseudo-merge of FIG. 3A is applied in an FAT file system. As shown in FIG. 3B, the file positions in the storage medium are recorded in a File Allocation Table. The first file has 4 first frames respectively stored in clusters C0~C3 of the storage medium; the second file has 3 second frames respectively stored in clusters C7~C9 of the storage medium. The first sample table (i.e. the third file) is stored in a cluster C4 of the storage medium; the second sample table (i.e. the fourth file) is stored in a cluster C10 of the storage medium. The EOFs of the first file, the second file, the third file and the fourth file are respectively positioned at the clusters C3, C9, C4 and C10. The header H includes an original file length of the first file recorded at the start position of the first file.

As shown in FIG. 3B, the content of the FAT is modified to be the FAT', and linkage relationship among the first file, the second file, the third file and the forth file is established so as to pseudo-merging the files. To merge two files into a merged file, in the File Allocation Table, the end position of the first file is modified to be the start position of the second file, or a linkage relationship among the first file and the second files is established in the File Allocation Table. As shown in FIG. 3B, in the modified FAT', the cluster C3 points towards the cluster C7, and therefore, the linkage relationship is established between the first file and the second file by linking the cluster C3 to the cluster C7, thus pseudo-merging the first file and the second file. The cluster C9 points towards the cluster C4, and therefore, the linkage relationship is established between the second file and the third file by linking the cluster C9 to the cluster C4, thus pseudo-merging the second file and the third file. The cluster C4 points towards the cluster C10, and therefore, the linkage relationship is established between the third file and the forth file by linking the cluster C4 to the cluster C10, thus pseudo-merging the third file and the forth file. By doing so, the first, second, third and forth files are merged into a merged file. In the merged file, the first file is followed by the second file, the second file is followed by the third file, and the third file is followed by the forth file. The first file and the second file are preferred to be two multimedia data files which are recorded at the same time. The first file and the second file are respectively a video data file and an audio data file, or are respectively an audio file and a video file.

As shown in FIG. 3B, before the pseudo-merge, the end position of the first file in the FAT is E, and then is modified to be the start position of the second file, which is the cluster C7. Similarly, before the pseudo-merge, the end position of the second file in the FAT is E, and then is modified to be the start position of the third file, which is the cluster C4, while the end position of the third file is modified from E to be the start position of the forth file, which is the cluster C10. Thus, the pseudo-merging of the first, second, third and forth files are achieved.

Similarly, after the pseudo-merge, as shown in FIG. 3B, the header H in the first file is updated to be H' in the merged file for records the merged file length of the merged file, while the file type recorded in the header H' is the same as that recorded in the header H, which is the file type of multimedia data file. The multimedia data file does not require compact linkage, so the holes existing in the first, second, third and forth files are acceptable for the file system. Therefore, the file system will processes/handles the holes existing in the merged file after the pseudo-merge.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method, applied in an electronic apparatus, for merging a first file and a second file stored in the electronic apparatus, wherein the electronic apparatus comprises a storage medium and a File Allocation Table (FAT) for recording a first start position and a first end position in the storage medium for the first file and recording a second start position and a second end position in the storage medium for the second file, the first file having a header for recording an original file length of the first file, the method comprising:
   modifying the first end position of the first file to be the second start position of the second file so as to merge the first and second files into a first merged file;
   calculating a merged file length of the first merged file, wherein the step of calculating the merged file length comprises:
      obtaining a magnetic region size (S) of the storage medium;
      respectively obtaining the original file length (N1) of the first file and a second file length (N2) of the second file;
      calculating M1=ceil(N1/S) and M2=ceil(N2/S), where ceil(x) is the least integer greater than or equal to x; and
      obtaining the merged file length (LEN) to be equal to (M1+M2)*S; and
   updating the header with the merged file length so that the merged file length is recorded in the header.

2. The method according to claim 1, wherein the first file has at least one first frame, and the method further comprises:
   converting sample data of the first frame to be a sample table; and
   appending the sample table to the end of the first merged file.

3. The method according to claim 1, wherein the first file has at least one first frame, and the method further comprises:
   converting sample data of the first frame to be a sample table, which is a third file having a third start position and a third end position; and modifying the second end position of the second file to be the third start position of the third file so as to merge the first merged file and the third file into a second merged file.

4. The method according to claim 1, wherein the electronic apparatus has an embedded system, and the storage medium is a flash memory.

5. The method according to claim 1, wherein the first file and the second file are multimedia data files which are recorded at the same time.

6. The method according to claim 5, wherein the first file and the second file are respectively a video data file and an audio data file.

7. The method according to claim 5, wherein the first file and the second file are respectively an audio file and a video file.

8. A method, applied in an electronic apparatus, for merging a first file and a second file stored in the electronic apparatus, wherein the electronic apparatus comprises a storage medium and a File Allocation Table (FAT) for recording a first start position and a first end position in the storage medium for the first file and recording a second start position and a second end position in the storage medium for the second file, the method comprising:
   modifying the first end position of the first file to be the second start position of the second file so as to merge the first and second files into a first merged file;
   obtaining a magnetic region size (S) of the storage medium;
   respectively obtaining the original file length (N1) of the first file and a second file length (N2) of the second file;
   calculating M1=ceil(N1/S), where ceil(x) is the least integer greater than or equal to x; and
   obtaining the merged file length (LEN) to be equal to M1*S+N2.

9. The method according to claim 8 further comprising:
   updating an attribute of the first merged file in a file system of the electronic apparatus as being the merged file length.

10. A method, applied in an electronic apparatus, for merging a first file and a second file stored in the electronic apparatus, wherein the electronic apparatus includes a storage medium and a File Allocation Table (FAT), the first file has at least one first frame and the second file has at least one second frame, the storage medium has a plurality of clusters for storing the first file and the second file, one first/second frame is stored in one cluster of the storage medium, and the storage positions of the first and second files are recorded in the FAT, the method comprising:

establishing a linkage relationship between the first file and the second file by linking the last one of the first frame(s) to the first one of the second frame(s) in the FAT; wherein the first and second files are merged into a first merged file;

recording a header in the first file, wherein the header records an original file length of the first file;

calculating a merged file length of the first merged file, wherein the step of calculating the merged file length comprises:

obtaining a magnetic region size (S) of the storage medium;

respectively obtaining the original file length (N1) of the first file and a second file length (N2) of the second file;

calculating M1=ceil(N1/S) and M2=ceil(N2/S); and obtaining the merged file length (LEN) to be equal to (M1+M2)*S; and updating the header so that the merged file length is recorded in the header.

11. The method according to claim 10, further comprising:

converting sample data of the first frame(s) to be a sample table; and appending the sample table to the end of the first merged file.

12. The method according to claim 10, further comprising:

converting sample data of the first frame(s) to be a sample table, which is a third file having at least one third frame; and establishing a linkage relationship between the first merged file and the third file by linking the last one of the second frame(s) to the first one of the third frame(s) in the FAT;

wherein the first merged file and the third file is merged into a second merged file.

13. The method according to claim 10, wherein the electronic apparatus has an embedded system, and the storage medium is a flash memory.

14. The method according to claim 10, wherein the first file and the second file are multimedia data files recorded at the same time.

15. A file merging apparatus, for merging a first file and a second file, the apparatus comprising:

a storage medium for storing the first file and the second file; and a File Allocation Table (FAT) for recording a first start position and a first end position for the first file stored in the storage medium, and for recording a second start position and a second end position for the second file stored in the storage medium, wherein the first end position of the first file is modified to be the second start position of the second file so as to merge the first file and the second file into a first merged file, wherein the first merged file has a merged file length (LEN) to be equal to ceil(N1/S)+N2, where S is a magnetic region size, N1 is a first file length, N2 is a second file length, and ceil(x) is the least integer greater than or equal to x.

16. The apparatus according to claim 15, wherein the electronic apparatus comprises a file system in which an attribute of the first merged file is updated as being the merged file length.

17. A file merging apparatus, for merging a first file and a second file, the apparatus comprising:

a storage medium for storing the first file and the second file; and a File Allocation Table (FAT) for recording a first start position and a first end position for the first file stored in the storage medium, and for recording a second start position and a second end position for the second file stored in the storage medium, wherein the first end position of the first file is modified to be the second start position of the second file so as to merge the first file and the second file into a first merged file, wherein the first merged file has a merged file length (LEN) which is recorded in a header of the first file and equal to ceil(N1/S)+ceil(N2/S), where S is a magnetic region size, N1 is a first file length, N2 is a second file length, and ceil(x) is the least integer greater than or equal to x.

18. The apparatus according to claim 17, wherein the first file includes a header recorded therein, and the header is for recording an original file length of the first file and will be updated to record a merged file length of the first merged file after the merging of the first and second files.

19. The apparatus according to claim 17, wherein the first file comprises at least one first frame, and the storage medium further stores a sample table, wherein the sample table is obtained by converting the sample data of the first frame(s) and is appended to the end of the first merged file.

20. The apparatus according to claim 17, wherein the first file comprises at least one first frame, and the storage medium further stores a sample table, wherein the sample table is obtained by converting the sample data of the first frame(s), and the sample table is a third file having a third start position and a third end position;

wherein the second end position of the second file is modified to be the third start position of the third file so as to merge the first merged file and the third file into a second merged file.

21. A file merging apparatus, for merging a first file and a second file, the apparatus comprising:

a storage medium has a plurality of clusters for storing the first file and the second file, wherein the first file comprises at least one first frame and the second file comprises at least one second frame, and one first/second frame is stored in one cluster of the storage medium; and a File Allocation Table (FAT) for recording the storage positions of the first and second files;

wherein the first file and the second file are merged into a merged file by linking the last one of the first frame(s) to the first one of the second frame(s) in the FAT, wherein the merged file has a merged file length (LEN) which is recorded in a header of the first file and equal to ceil(N1/S)+ceil(N2/S), where S is a magnetic region size, N1 is a first file length. N2 is a second file length, and ceil(x) is the least integer greater than or equal to x.

* * * * *